United States Patent [19]

Case et al.

[11] 3,954,655

[45] May 4, 1976

[54] METHOD OF TAGGING SAND WITH RUTHENIUM-103 AND THE RESULTANT PRODUCT

[75] Inventors: Forrest N. Case, Oak Ridge; Clyde E. McFarland, Knoxville, both of Tenn.

[73] Assignee: The United States of America as represented by the United States Energy Research and Development Administration, Washington, D.C.

[22] Filed: Dec. 27, 1974

[21] Appl. No.: 537,019

[52] U.S. Cl. .............................. 252/301.1 R; 427/6; 427/226; 427/229; 427/343; 427/353; 427/380

[51] Int. Cl.² .............................. C09K 3/00

[58] Field of Search ............... 427/6, 226, 229, 343, 427/353, 380; 428/404, 454; 252/301.1 R

[56] References Cited

UNITED STATES PATENTS

| | | | |
|---|---|---|---|
| 2,955,088 | 10/1960 | Beerbower et al. | 252/301.1 R |
| 3,149,233 | 9/1964 | Wilson et al. | 252/301.1 R |
| 3,322,563 | 5/1967 | Moore | 427/6 |
| 3,343,979 | 9/1967 | Hamrin | 427/6 |
| 3,450,597 | 6/1969 | Kramer et al. | 252/301.1 R |
| 3,700,602 | 10/1972 | Acree et al. | 252/301.1 R |
| 3,850,668 | 11/1974 | Heffer | 427/6 |

FOREIGN PATENTS OR APPLICATIONS

| | | | |
|---|---|---|---|
| 1,061,297 | 7/1959 | Germany | 252/301.1 R |

*Primary Examiner*—Harry J. Gwinnell
*Assistant Examiner*—Dennis C. Konopacki
*Attorney, Agent, or Firm*—Dean E. Carlson; David S. Zachry; Allen H. Uzzell

[57] ABSTRACT

A procedure for tagging sand with a radioisotope for use in the study of sediment transport involves the precipitation of a metal radioisotope in the form of an iodide directly on the sand, followed by heating the sand to a temperature sufficient to effect a phase transformation of the sand and a decomposition of the metal iodide, leaving the metal firmly attached to the sand.

5 Claims, No Drawings

METHOD OF TAGGING SAND WITH RUTHENIUM-103 AND THE RESULTANT PRODUCT

BACKGROUND OF THE INVENTION

This invention was made in the course of, or under, a contract with the United States Atomic Energy Commission. The present invention relates to the marking of sand for oceanographic studies. These studies provide useful information in oil well operations, waste disposal operations, ecological studies, and other studies where it is important to analyze the motion of particles in water. In such studies it is important that the sand be tagged in such a manner that its hydraulic properties are not affected. It is also important that the radioactive tag be highly resistant to leaching by salt water.

Some sediment transport studies are conducted in a geographical area where sand is moved only a few feet over a period of several months. The data from such tests is extrapolated to determine the distance the sand will move over a period of years. When this type of study is made, it is important that the half-life of the radioisotope be reasonably long, because the longer the study can be continued, the more accurate the extrapolated results will be.

The prior art includes several methods by which sand particles are tagged with radioactive material. Some processes involve attaching a radioactive material by means of a cement directly to the sand particle. Other methods use ceramic compositions to attach the radioisotope by fusion to the sand at high temperatures. Another method, disclosed in U.S. Pat. No. 3,700,602, involves the reduction of gold-198 by an aldehyde. Still another method involves neutral irradiation to transmute impurities in the sand into radioactive species; however, this method is very expensive.

A problem encountered in some methods cited is that the hydraulic properties of the sand are altered during the tagging process. Studies using such sand would be less accurate than studies using the subject invention.

Another problem with some of the earlier methods is the lack of long term stability of the tagged particle in sea water, the sea water leaching the tag out of the sand. Studies with such sand would be limited to qualitative studies of short duration.

Sand tagged with gold-198 by the process disclosed in U.S. Pat. No. 3,700,602 is stable in sea water; however, the half-life of gold-198 (64.8 hours) limits its utility to short term studies.

SUMMARY OF THE INVENTION

An object of the invention disclosed herein is to provide sand particles tagged with a radioisotope with a sufficiently long half-life to be useful in long term studies.

Another object of this invention is to provide tagged sand particles which are exceptionally stable in salt water and which have hydraulic properties identical to those of untagged sand.

A further object of this invention is to provide a process for tagging particles of sand with a radioisotope of a metal at a temperature at which said sand undergoes a phase transformation, comprising the steps of:

a. contacting said sand with a solution of a salt of said metal;

b. reacting said contacted sand with a solution of an iodide to effect precipitation of said metal as an iodide on the sand;

c. heating said sand to a temperature sufficient to effect both the phase transformation of said sand and the decomposition of said metal iodide to elemental metal and elemental iodine, for providing a radioactive tag; and d. washing the tagged sand to remove unreacted material and residues, leaving the tagged sand intact.

Sand tagged by the herein disclosed process is exceptionally stable in sea water and possesses hydraulic properties substantially the same as untagged sand. If the tag is ruthenium-103, the half-life of forty days makes it suitable for much longer studies than sand tagged with gold-198.

DESCRIPTION OF THE PREFERRED EMBODIMENT

According to this invention, it has been found that the above-mentioned objectives can be achieved. The sand is contacted by a salt solution of a metal radioisotope thus providing a source of radioactive metal ions. The solution is evaporated to dryness, leaving the metal salt thoroughly distributed throughout the sand. A solution of a soluble iodide is then reacted with the sand, causing the precipitation of an insoluble iodide of the metal on the sand. The sand is then heated to a temperature at which the sand will undergo a phase transformation. In the case of quartz sand, a phase transformation from alpha-quartz to beta-quartz occurs at 573°C. At this temperature, the metal iodide will decompose into elemental metal and elemental iodine. Upon cooling to room temperature, it is found that the metal is firmly bound to the sand particles.

The radioisotope employed for the tagging is preferably ruthenium-103 because of its half-life (40 days) and the fact that its chloride is soluble in hydrochloric acid while its iodide is insoluble in hydrochloric acid, thus enabling ruthenium triiodide to be precipitated from a solution of ruthenium trichloride and a soluble iodide. In addition, ruthenium triiodide will decompose to elemental ruthenium and elemental iodine at a temperature at which quartz sand undergoes a phase transformation. While studies have not been made using other metals, it is believed that other metals, particularly platinum and iridium, can be used to tag sand by the subject process.

It is believed that the fact that the phase transformation occurs at the same time as the ruthenium triiodide decomposes is responsible for the stability of the ruthenium tag on the sand. In order to more clearly demonstrate the subject process, an example is set forth below.

EXAMPLE

One liter of sand particles was classified to the size desired for the experiment by passing over and through appropriate screen size. In an actual survey, the sand used would be indigenous to the location that is to be observed. The sand was leached with 48 liters of 1N hydrochloric acid to remove carbonates, and washed with water to remove the acid and dissolved salts.

The sand was then soaked in a sufficient quantity of ruthenium trichloride and hydrochloric acid to completely wet the sand. The amount of ruthenium-103 was calculated to produce the desired radiation output necessary for a particular study. In this case the solution was composed of 10 curies of ruthenium-103 ions. The ruthenium-treated sand was then dried at 100°–150°C. This temperature range was chosen to avoid decomposition of the ruthenium trichloride on the sand.

To provide a means for adhering the ruthenium-103 to the sand, iodine was added in the form of a 2% potassium iodide solution in a sufficient quantity of water to cover the sand. This mixture was boiled for 30 minutes during which time the ruthenium trichloride converted to ruthenium triiodide. The excess solution was allowed to evaporate to dryness.

To complete the attachment of ruthenium to the particles, the sand was heated to 700°C for 2 hours. At this temperature the ruthenium triiodide decomposes to elemental ruthenium and elemental iodine. A temperature of at least 573°C is required to effect the phase transformation of quartz sand, but about 700°C the ruthenium will be oxidized.

The iodine was easily vaporized while the ruthenium remained firmly attached to the sand. After cooling the particles were washed until less than 0.01% of the ruthenium in the batch appeared in the wash water. This required two liters of water. Usually an amount of approximately two sand volumes is sufficient. The remaining ruthenium was firmly attached to the particles and they were ready for use.

Long term stability of the ruthenium tag was tested by exposing sand tagged using this procedure to simulated sea water. In one case the sand was placed in a flask of simulated sea water and slowly stirred to move the water column over the sand. In the second case the sand was placed in simulated sea water and agitated sufficiently to abrade one particle against another. The results of both tests show an overall loss of less than 0.04% over a period of more than three months, thus indicating an exceptionally stable tag.

The process taught in U.S. Pat. No. 3,700,602 was tried using ruthenium rather than gold. This process involved reducing ruthenium with aldehyde and precipitating the elemental ruthenium directly onto the sand, followed by heating to a temperature of 1000°C. After tagging by this process, up to 20% of the tag was lost in the washing process, and losses were continuous with subsequent washings. In addition to this process, heating ruthenium trichloride deposited on sand was tried. This also produced a high leach rate when exposed to sea water. Based upon these facts, it was therefore an unexpected result when the decomposition of the ruthenium iodide in combination with the phase transformation of the sand resulted in a tag so highly resistant to leaching in sea water.

What is claimed is:

1. A process for tagging quartz sand particles with a radioisotope of a metal at a temperature at which said sand undergoes a phase transformation comprising the steps of a. contacting said sand with a solution of a salt of said metal;

b. drying the contacted quartz sand at a temperature below the decomposition temperature of the metal salt;

c. reacting said contacted sand with a solution of an iodide to effect precipitation of said metal as an iodide on the sand;

d. heating said sand to a temperature sufficient to effect both the phase transformation of said sand and the decomposition of said metal iodide to elemental metal and elemental iodine, for providing a radioactive tag; and e. washing the tagged sand to remove unreacted material and residues, leaving the tagged sand intact.

2. The process claimed in claim 1 wherein said heating step is carried out in air at a temperature sufficiently high to effect both a phase shift of said sand and decomposition of said metal iodide to elemental metal and elemental iodine, and below the temperature at which oxidation of said metal occurs.

3. The process claimed in claim 1 wherein said metal is ruthenium.

4. The process claimed in claim 1 wherein said radioisotope of said metal is ruthenium-103 and the temperature of said heating step is about 573°C to 700°C.

5. The tagged quartz sand particles produced by the process claimed in claim 4.

* * * * *